UNITED STATES PATENT OFFICE 2,645,578

LITHOGRAPH-PLATE PREPARATION

William H. Wood, Mantua, Ohio, assignor to Harris-Seybold Company, Cleveland, Ohio, a corporation of Delaware No Drawing. Application January 22, 1949,
Serial No. 72,279

6 Claims. (Cl. 95—7)

Gum arabic has been very extensively employed in treatment of lithograph plates for initially coating the plates and also for dampening the plates during printing and for coating the plates for storage. Gum arabic, however, has an inherent disadvantage of varying widely in its properties of viscosity ratio, behavior with light-sensitizing agents, etc., and in being susceptible to deterioration by action of bacteria and molds even in presence of permissible antiseptic additions. A more uniform agent has long been desired and sought in the lithographic industry. In accordance with the present invention, it now becomes possible to treat lithographic plates with a material which has superior uniformity and adaptability. Other objects and advantages will appear from the following description.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

I have found that by treating gum arabic with a cation-exchange material, a reaction product is obtained which has a remarkably low pH and which can be made to a desired standard of uniformity, and which remains stable. In general, gum arabic, dissolved in water to usually about 20 or 22 per cent concentration, and filtered as necessary to remove wood particles and foreign materials, is treated with the cation-exchange agent in suitable contact. This agent is available in the form of acid-treated zeolites, carbonaceous materials such as lignite, peat, coal, etc., treated with fuming sulphuric acid, and synthetic resins such as phenol-formaldehyde-sulphonic acid resins, commercial instances of which are sold under the trade name "Amberlite," "Ionac," "Dowex," etc. These cation-exchange agents in general are high molecular combinations based on the fourth group elements carbon or silicon in which the very large molecules have loosely bound hydrogen. Gum arabic is "composed chiefly of the calcium, magnesium and potassium salts of arabic acid" (Webster's New International Dictionary, 1935). Analyses indicate that the reaction products of a treatment of gum arabic with the cation-exchange agent are hydrogen-containing, to the exclusion of metallic elements. The product is not a mere purified gum arabic, it is not gum arabic at all. It is a reaction product, the metal salts constituting gum arabic having been decomposed and apparently arabic acid formed. The latter differs from the product of mineral acid on gum arabic in being substantially arabic acid instead of acid-hydrolyzed derivatives of it, and hence having a materially superior viscosity. The treatment of the gum with the cation-exchange agent can be accomplished in such manner as convenient, e. g. by adequate contacting and then decanting off the liquid, but desirably the agent may, in granular form, be applied as a bed through which the gum solution may be passed, by gravity or pumping. The product solution initially has a pH of about 2.0, for instance, which increases gradually as the cation-exchange material becomes exhausted. Thus, a product of desired pH figure may be readily obtained. It is unique, in distinction from prior known derivatives from gum arabic made by acid-precipitating gum arabic or by dialyzing, in that not only is the pH number lower than that of any derivative heretofore customary from gum arabic, but a very surprising feature is that the present reaction product is peculiarly immune to the usual rapid bacterial and mold attack.

In treating plates in accordance with the present invention, the reaction product of gum arabic with the cation-exchange agent as aforedescribed in water solution is applied for coating. A peculiarity of this product is its low viscosity as compared to gum arabic or acids prepared by the acid precipitation process or by dialysis, for a solution of similar concentration. Thus a film of more desirable thickness may be readily obtained, whether in the initial preparation of the plate or in subsequent application during the usage or storage of the plate. In the initial preparation of the plate, the plate of usual or preferred kind, zinc, aluminum, magnesium, etc., for example, is cleaned and counteretched in the usual manner and thereafter a coating of the present reaction product together with a light-sensitizing addition, usually ammonium dichromate is applied. The plate thus coated is then exposed to light in the form of a positive transparency of the subject matter to be reproduced, and the plate is subsequently treated by a developing agent to remove the image portions of the coating. Such developers as are customary in the art may be employed, or preferably, for example, a solution including magnesium chloride and a hydroxydicarboxylic acid. And, following removal of the unhardened portions of the coating by the developer, the plate may be etched with a deep-etch etching solution of known type, for example, a magnesium chloride-hydrochloric acid solution. In some instances, instead of the acid cation-exchange product, it is preferred to employ, for the sensitized coating, the product neutralized or as a salt. Thus, the ammonium salt or sodium salt or potassium salt or salt of an organic base such as morpholine, ethanolamine, etc. may be applied. Or, in some instances, the acid reaction product and a salt thereof may be applied together. A desirable deep-etch sensitive coating is as follows: To a 17.8% solution of the ammonia-neutralized reaction product as afore-described, ammonium dichromate is added in the proportion of 1 part dichromate to 3.65 parts of the former, on the basis of solids. To this solution ammonia is then added to bring the pH within the range of 8.8 to 10.0. The viscosity of the final solution is in the range of 26-29 centipoises. In general, the solution of the exchange-produced material as just noted may be initially between 15 and 25 per cent and the ratio of the dichromate thereto could be as high as 1 to 3. Also the addition of ammonia could be varied to yield a pH as low as 7 or lower and as high as around 10. Of course, the viscosity would vary correspondingly.

Where the unneutralized exchange-acid product is preferred as the basis for such deep-etch sensitive coating, the above formula may be followed except that no ammonia is added. In this instance diazo light-sensitizing agents may be used advantageously instead of ammonium dichromate or other similar salt.

After development to remove the unhardened areas of coating, a deep-etch solution is applied to the plate and is allowed to act until the etching has gone to the desired depth, and after drying and cleaning, the etched areas are treated with a material, commonly referred to as a lacquer, to render them receptive to ink. Ultimately, the light-hardened areas of the resist, which during etching have served to protect the non-image areas of the plate, are removed by a "clean-up" solution, and the plate is given a de-sensitizing etch to render the non-image areas receptive to water, and it is ready for printing.

It will be understood that by reason of the remarkably favorable viscosity ratio of the present exchange-produced acid product, the necessity of including other colloids as heretofore customary, such as egg albumen, gelatin, etc., is now eliminated; and the material is particularly uniform. As apparent also, instead of including the light-sensitive agent in the solution which is coated on the plate, where desired, the plate may be coated with the present product and the light-sensitizing agent may be applied at other desired stage.

Other modes of applying the principle of the invention may be employed, change being made as regards the detail described, provided the features stated in any of the following claims, or the equivalent of such, be employed.

I therefore particularly point out and distinctly claim as my invention:

1. In the treatment of lithographic plates, surfacing the plate with the reaction product of a cation-exchange material of gum arabic formed by contacting such material and the gum in aqueous solution at ordinary temperature and subsequently separating the gum derivative, and providing a lithographic light-sensitizing agent therein.

2. In the treatment of lithographic plates, applying to the plate a solution of neutralized reaction product of a cation-exchange material on gum arabic formed by contacting such material and the gum in aqueous solution at ordinary temperature and subsequently separating the gum derivative, and providing a lithographic light-sensitizing agent therein.

3. In the treatment of lithographic plates, applying to the plate a solution of the ammonia-neutralized reaction product of a cation-exchange material on gum arabic formed by contacting such material and the gum in aqueous solution at ordinary temperature and subsequently separating the gum derivative, and providing a lithographic light-sensitizing agent therein.

4. A lithographic plate surfaced with the reaction product of a cation-exchange material on gum arabic formed by contacting such material and the gum in aqueous solution at ordinary temperature and subsequently separating the gum derivative, and provided with a lithographic light-sensitizing agent.

5. A lithographic plate surfaced with neutralized reaction product of a cation-exchange material on gum arabic formed by contacting such material and the gum in aqueous solution at ordinary temperature and subsequently separating the gum derivative, and provided with a lithographic light-sensitizing agent.

6. A lithographic plate surfaced with the ammonia-neutralized reaction product of a cation-exchange material on gum arabic formed by contacting such material and the gum in aqueous solution at ordinary temperature and subsequently separating the gum derivative, and provided with a lithographic light-sensitizing agent.

WILLIAM H. WOOD.

References Cited in the file of this patent

UNITED STATES PATENTS

| Number | Name | Date |
|---|---|---|
| 2,240,116 | Holmes et al. | Apr. 29, 1941 |
| 2,269,481 | Reindorp | Jan. 13, 1942 |

FOREIGN PATENTS

| Number | Country | Date |
|---|---|---|
| 4,043 | Great Britain | of 1912 |
| 21,958 | Great Britain | of 1913 |
| 353,511 | Great Britain | July 27, 1931 |